United States Patent
Minematsu et al.

(10) Patent No.: US 11,579,845 B2
(45) Date of Patent: Feb. 14, 2023

(54) RANDOM NUMBER GENERATION DEVICE, RANDOM NUMBER GENERATION METHOD, ENCRYPTION DEVICE, AND NON-TRANSITORY RECORDING MEDIUM

(71) Applicant: NEC Corporation, Tokyo (JP)

(72) Inventors: Kazuhiko Minematsu, Tokyo (JP); Yuki Tanaka, Tokyo (JP); Kentarou Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 390 days.

(21) Appl. No.: 16/633,300

(22) PCT Filed: Jul. 26, 2017

(86) PCT No.: PCT/JP2017/027035
§ 371 (c)(1),
(2) Date: Jan. 23, 2020

(87) PCT Pub. No.: WO2019/021386
PCT Pub. Date: Jan. 31, 2019

(65) Prior Publication Data
US 2020/0150928 A1    May 14, 2020

(51) Int. Cl.
*G06F 7/58* (2006.01)
*G09C 1/00* (2006.01)
(Continued)

(52) U.S. Cl.
CPC .............. *G06F 7/582* (2013.01); *G09C 1/00* (2013.01); *H04L 9/0662* (2013.01);
(Continued)

(58) Field of Classification Search
CPC ............. G06F 7/58–588; H04L 9/3093; H04L 9/0662; H04L 9/0872; H04L 2209/08; H04L 2209/12; G09C 1/00
See application file for complete search history.

(56) References Cited

U.S. PATENT DOCUMENTS 4,499,551 A * 2/1985 Frank ...................... G06F 7/58
708/250
2015/0172044 A1   6/2015 Teranishi
(Continued)

FOREIGN PATENT DOCUMENTS

| JP | H09-311627 A | 12/1997 |
| JP | 2005-049898 A | 2/2005 |

(Continued)

OTHER PUBLICATIONS

International Search Report for PCT Application No. PCT/JP2017/027035, dated Oct. 3, 2017.
(Continued)

*Primary Examiner* — Emily E Larocque
(74) *Attorney, Agent, or Firm* — Sughrue Mion, PLLC

(57) ABSTRACT

Provided are a random number generation device and the like capable of calculating a high precision random number using a memory capacity selected irrespective of the precision of the random number. A random number calculation device is configured to generate first random numbers based on given number and specify, for the given number of second random numbers in a target numeric extent, bin range depending on the first random numbers based on frequency information representing cumulative frequency regarding a frequency of numeric extent including respective second random numbers among given numeric extents, the numeric extent being determined in accordance with a desirable precision.

10 Claims, 8 Drawing Sheets

(51) Int. Cl.
*H04L 9/06* (2006.01)
*H04L 9/08* (2006.01)

(52) U.S. Cl.
CPC ........ *H04L 9/0872* (2013.01); *H04L 2209/08* (2013.01); *H04L 2209/12* (2013.01)

(56) References Cited

U.S. PATENT DOCUMENTS

2017/0371936 A1* 12/2017 Yu ........................ G06F 17/18
2018/0285077 A1* 10/2018 Yu ........................ G06F 7/58

FOREIGN PATENT DOCUMENTS

JP    2014-109697 A    6/2014
WO   2014/007296 A1   1/2014

OTHER PUBLICATIONS

English translation of Written opinion for PCT Application No. PCT/JP2017/027035.

Fumiaki Sato, "Chapter 3 Samazama na Ransu no Seiseiho", Simulation, first edition, Kyoritsu Shuppan Co., Ltd. Mitsuaki Nanjo, Feb. 25, 2013 (Feb. 25, 2013), pp. 22 to 35, Japan.

Yuki Tanaka et al, "Efficient Discrete Gaussian Sampling on Constrained Devices", IEICE Technical Report, Jul. 7, 2016 (Jul. 7, 2016), vol. 116, No. 131, pp. 169 to 175, Japan.

* cited by examiner

RANDOM NUMBER GENERATION DEVICE, RANDOM NUMBER GENERATION METHOD, ENCRYPTION DEVICE, AND NON-TRANSITORY RECORDING MEDIUM

This application is a National Stage Entry of PCT/JP2017/027035 filed on Jul. 26, 2017, the contents of all of which are incorporated herein by reference, in their entirety.

TECHNICAL FIELD

The present invention relates to a random number generation device and the like that generates a random number with high precision.

BACKGROUND ART

Lattice-based cryptography is one example of cryptography being difficult to decrypt even when a quantum computer is used in decrypting the cryptography. A precise random number (i.e., having a large number of digits) is used in lattice-based cryptography.

PTL 1 discloses an example of processing of executing processing by using random numbers. PTL 1 discloses an encoding device that encodes information based on a sequence of random numbers that follows a probability distribution. The encoding device generates a sequence of random numbers following a probability distribution based on a conditional probability in which a generated random number is used as a condition.

CITATION LIST

Patent Literature

PTL 1: Japanese Unexamined Patent Application Publication No. 2014-109697

SUMMARY OF INVENTION

Technical Problem

In the lattice-based cryptography, a precise random number (i.e., having a large number of digits) is required for generating strong cryptography by using lattice-based cryptography. Further, a precise random number may be required in fields such as numeric simulation and data mining. However, processing of generating a random number with high precision requires a lot of computing machine resources such as a memory. A precise random number cannot be generated even when the encoding device disclosed in PTL 1 is used. A reason for this is that the encoding device cannot generate a random number depending on precision.

In view of the above, one of objectives of the present invention is to provide a random number generation device and the like that can generate a precise random number with a memory capacity that does not depend on precision.

Solution to Problem

As an aspect of the present invention, a random number generation device includes:

a random number generation means for generating first random numbers based on a given number; and a specification means for specifying, for the given number of second random numbers in a target numeric extent, bin ranges depending on the first random numbers based on frequency information representing cumulative frequency regarding a frequency in numeric extent including respective second random numbers among given numeric extents, the numeric extent being determined in accordance with a desirable precision.

In addition, as another aspect of the present invention, a random number generation method includes:

generating first random numbers based on a given number; and specifying, for the given number of second random numbers in a target numeric extent, bin ranges depending on the first random numbers based on frequency information representing cumulative frequency regarding a frequency in numeric extent including respective second random numbers among given numeric extents, the numeric extent being determined in accordance with a desirable precision.

In addition, as another aspect of the present invention, a random number generation program causes a computer to achieve:

a random number generation function for generating first random numbers based on a given number; and a specification function for specifying, for the given number of second random numbers in a target numeric extent, bin ranges depending on the first random numbers based on frequency information representing cumulative frequency regarding a frequency in numeric extent including respective second random numbers among given numeric extents, the numeric extent being determined in accordance with a desirable precision.

Furthermore, the object is also achieved by a computer-readable recording medium that records the program.

Advantageous Effects of Invention

A random number generation device and the like according to the present invention can generate a precise random number with a memory capacity that does not depend on precision.

EXAMPLE EMBODIMENT

Next, example embodiments of the present invention will be described in detail with reference to drawings.

First Example Embodiment

Figure 1:
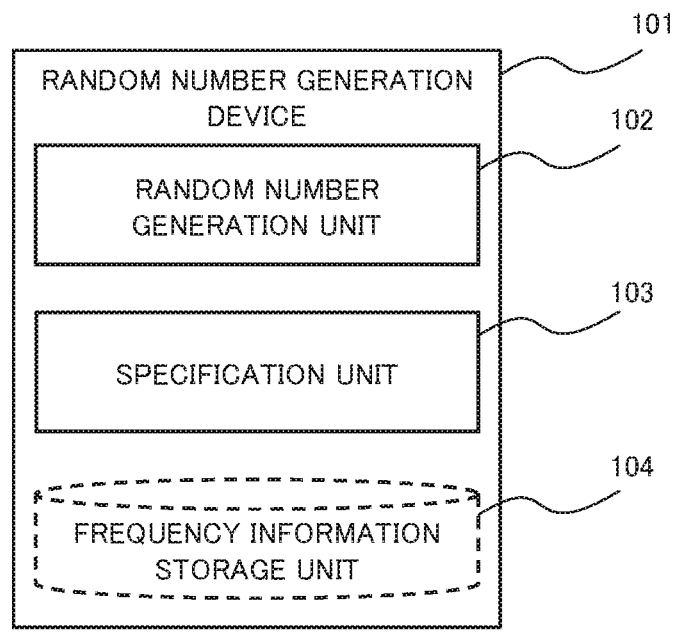
FIG. 1 is a block diagram illustrating a configuration of a random number generation device according to a first example embodiment of the present invention.

A configuration of a random number generation device 101 according to a first example embodiment of the present invention will be described in detail with reference to FIG. 1. FIG. 1 is a block diagram illustrating the configuration of the random number generation device 101 according to the first example embodiment of the present invention.

The random number generation device 101 according to the first example embodiment includes a random number generation unit (random number generator) 102 and a specification unit (specifier) 103. The random number generation device 101 may further include a frequency information storage unit 104.

Figure 3:
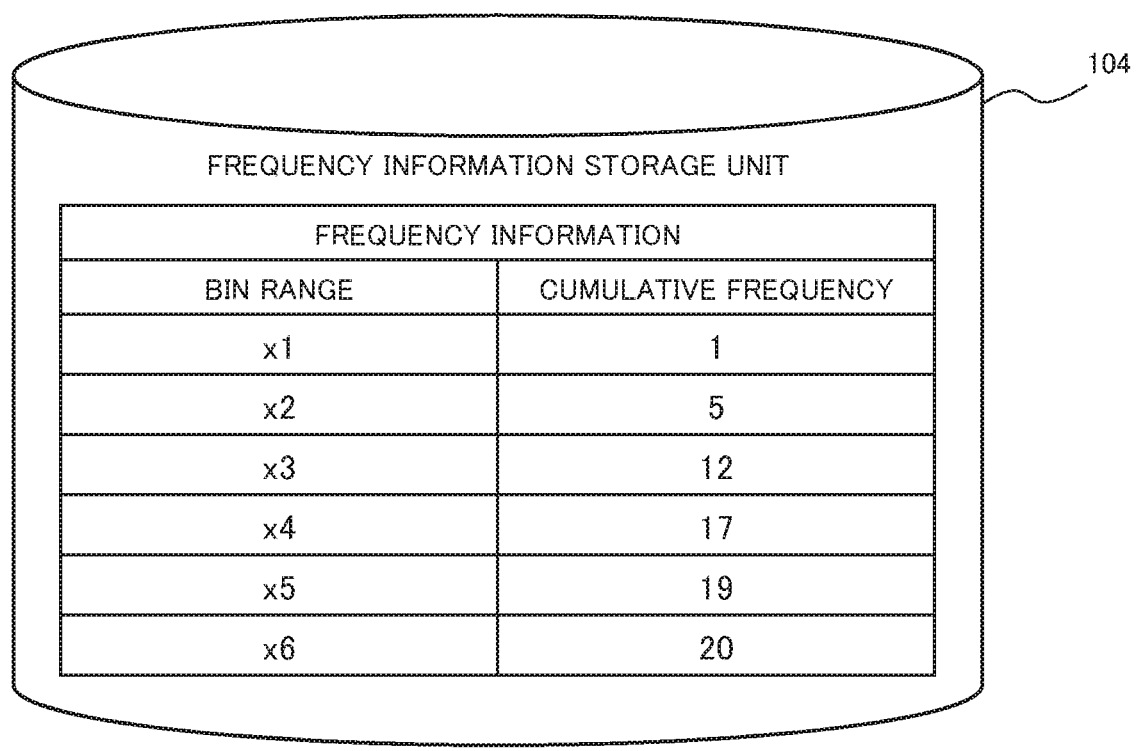
FIG. 3 is a diagram conceptually illustrating one example of frequency information stored in a frequency information storage unit.

The frequency information storage unit 104 stores frequency information (exemplified in FIG. 3) that represents a cumulative frequency concerning the number (or a frequency) of numeric values included in each of given bin ranges. FIG. 3 is a diagram conceptually illustrating one example of the frequency information stored in the frequency information storage unit 104.

In the following description, the number of numeric values included in each of the given bin ranges is simply represented as "a frequency in the bin range". Further, for convenience of description, the description will be made with reference to an example using a random number as a numeric value. However, a numeric value is not limited to a random number. A random number may be a pseudo random number. In this case, when a given number of random numbers exist, for example, numeric values included in the bin range represent the random numbers included in each of the bin ranges.

In the frequency information, identification information for identifying a bin range is associated with information representing a cumulative frequency concerning the number of a plurality of numeric values included in the bin range (i.e., a frequency in the bin range).

Figure 4:
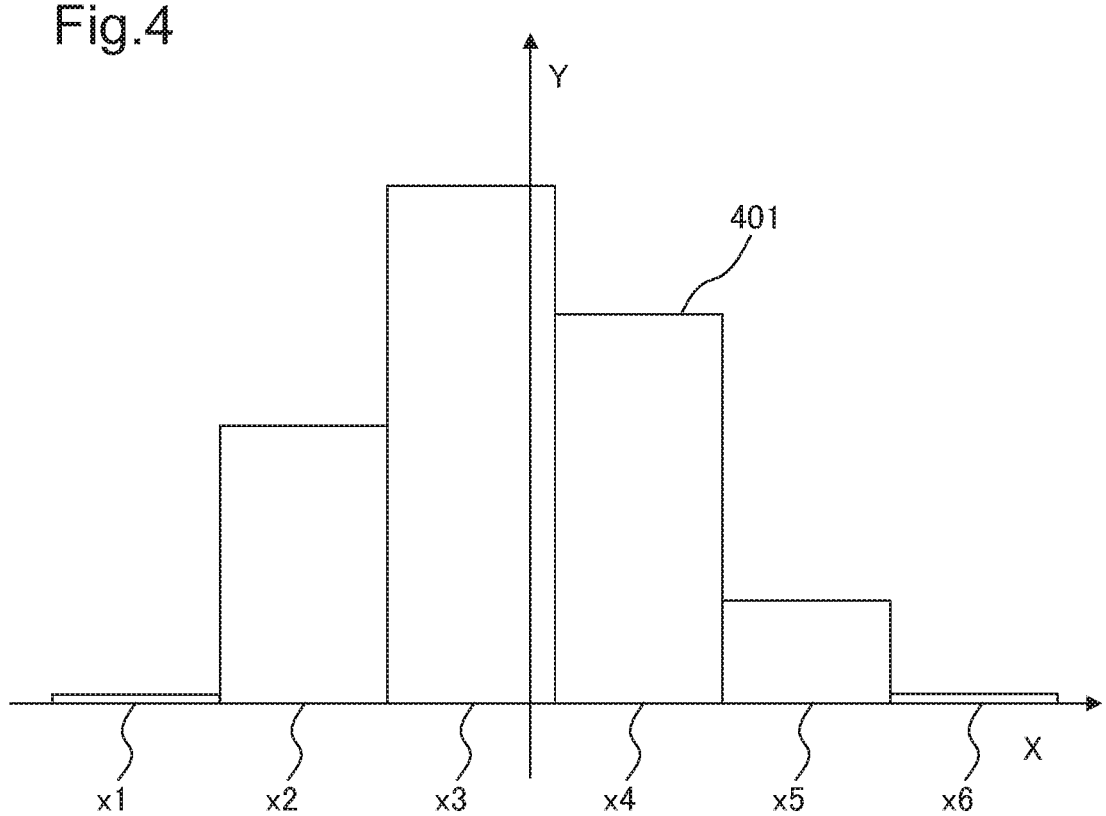
FIG. 4 is a diagram conceptually illustrating one example of a probability distribution.

For example, a plurality of the numeric values are random numbers generated with desired precision (or the desired number of digits) in accordance with a probability distribution 401 (exemplified in FIG. 4). FIG. 4 is a diagram conceptually illustrating one example of the probability distribution 401. The horizontal axis indicates a numeric value representing a value of a random variable ("X" in FIG. 4), and represents that a value is larger to the right side. The vertical axis represents a probability ("Y" in FIG. 4), and represents that a probability is higher to the upper side.

The probability distribution 401 may be a mathematically defined probability distribution such as a discrete Gaussian distribution, or may be a probability distribution approximated depending on the desired precision. For example, the approximated probability distribution is generated by ignoring a numeric extent where a probability can be approximated as zero with the desired precision. For example, the probability distribution approximated for the probability distribution exemplified in FIG. 4 is generated by approximating, as zero, a probability ("Y" in FIG. 4) in a numeric extent smaller than a bin range $x_1$ and a probability in a numeric extent larger than a bin range $x_6$.

For example, the bin ranges are generated by dividing, into a plurality of ranges, a numeric extent included in the probability distribution approximated as described above. For example, FIG. 4 exemplifies six bin ranges consisting of the first bin range ("$x_1$" in FIG. 4) to the sixth bin range ("$x_6$" in FIG. 4).

Figure 5:
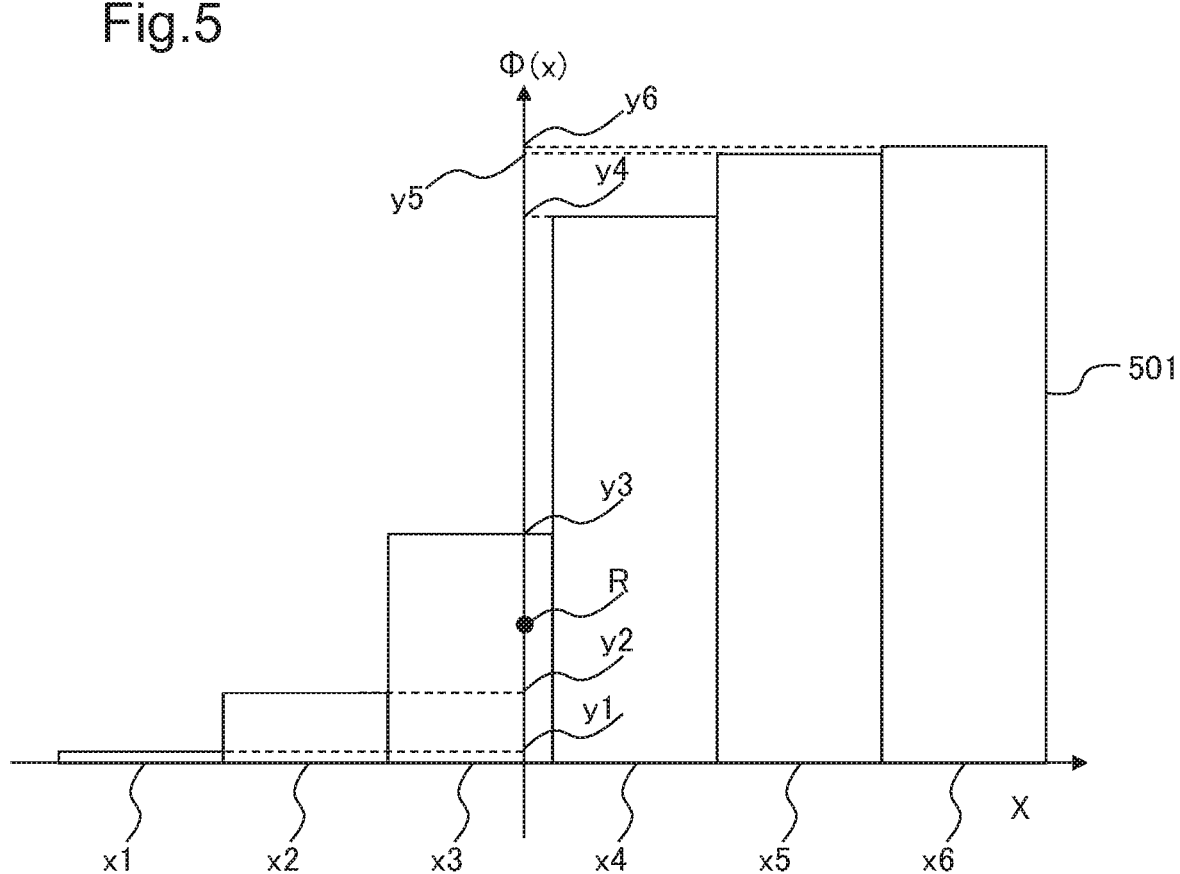
FIG. 5 is a diagram conceptually representing one example of a cumulative distribution.

For example, in the probability distribution 401 exemplified in FIG. 4, a cumulative distribution 501 exemplified in FIG. 5 represents a distribution concerning a summed value acquired by summing probabilities in order from a smaller numeric value (i.e., from the left in the horizontal axis). FIG. 5 is a diagram conceptually representing one example of the cumulative distribution 501. The horizontal axis indicates a numeric value representing a value of a random variable ("X" in FIG. 5), and represents that a numeric value is larger to the right side. The vertical axis represents a cumulative probability ("$\varphi(x)$" in FIG. 5), and represents that a cumulative probability is higher to the upper side.

For example, in encryption processing for Lattice-based cryptography or the like, processing of specifying the bin range in accordance with a random number R generated in relation to a cumulative probability is executed based on the cumulative distribution 501. This method is also referred to as an inversion (transform) sampling method. The following will describe processing of specifying the bin range in accordance with a random number R in the inversion sampling method.

In the cumulative distribution 501, bin ranges (e.g., the first bin range to the sixth bin range) can be defined similarly to the probability distribution 401 (exemplified in FIG. 4). The cumulative distribution 501 is a function that increases monotonously as a value of a random variable increases. In the cumulative distribution 501 exemplified in FIG. 5, a range of a cumulative probability in accordance with each bin range is determined as follows.

First bin range: a range equal to or smaller than $y_1$,
Second bin range: a range larger than $y_1$ and equal to or smaller than $y_2$,
Third bin range: a range larger than $y_2$ and equal to or smaller than $y_3$,
Fourth bin range: a range larger than $y_3$ and equal to or smaller than $y_4$,
Fifth bin range: a range larger than $y_4$ and equal to or smaller than $y_5$,
Sixth bin range: a range larger than $y_5$ and equal to or smaller than $y_6$.

For example, $y_6$ denotes a cumulative probability "1".

The range of a cumulative probability is information that is a basis for specifying the bin range.

Processing of specifying a bin range in accordance with a random number R includes specifying the range (i.e., "$y_{i-1} < R \leq y_i$") including a random number R and specifying the bin range based on the specified range. In the cumulative distribution 501 exemplified in FIG. 5, the random number R satisfies "$y_2 < R \leq y_3$", therefore, the bin range in accordance with the random number R is the third bin range ("$x_3$" in FIG. 5). When a plurality of random numbers R exist, processing of specifying the bin range is executed for each of the random numbers. Further, in the case of specifying the bin range for a random number R generated with desired precision, it is necessary to set, with at least the desired precision, threshold values (e.g., $y_1$ to $y_6$ described above) for representing a range that includes the random number R. For example, in order to generate a random number with high precision, it is necessary to represent the threshold values with precision equal to or higher than the precision for the random number.

In the frequency information exemplified in FIG. 3, a cumulative frequency is a cumulative frequency concerning the number (frequency) of random numbers specified as being in each bin range. Processing of specifying a bin range is the processing similar to that as described above with reference to FIG. 5. In the processing, a given number of random numbers are generated with desired precision in accordance with a certain probability distribution, and for the generated random numbers, the bin ranges for the random numbers are specified with the desired precision, for example.

The given number is determined in accordance with a use form in the case of using random numbers generated by the random number generation device 101 according to the present example embodiment, or a type of a block cipher that uses the random numbers, for example. Here, it is assumed that the given number is denoted as "N" (N is a natural number). For example, the given number is set as a value that is sufficiently secure, the value in which a practical bit block cipher (e.g., having a bit width at a level of (log N)) exists, and the value that is larger than the number required by the use form. Here, "log" represents a logarithmic function in which a base is 2, for example. The smaller the given number, the smaller a memory capacity required for processing of generating random numbers. The given number is set as a value (a value such as $2^{32}$ or $2^{64}$) depending on a type of a block cipher, for example.

A frequency concerning the cumulative frequency in the frequency information exemplified in FIG. 3 represents the number (frequency) of random numbers included in each bin range when the bin range for a random number (or a numeric value) generated with desired precision is specified with the desired precision. Accordingly, in the frequency information exemplified in FIG. 3, a cumulative frequency represents a summed value acquired by summing frequencies included in a bin range in order from the bin range with a smaller numeric value in the bin range (e.g., from the left in the horizontal axis direction in FIG. 4).

With reference to an example of random numbers generated in accordance with the probability distribution exemplified in FIG. 4, the following will describe the frequency information (exemplified in FIG. 3). For convenience of the description, it is assumed that the number of the random numbers is as follows for the first bin range to the sixth bin range.

First bin range: 1,
Second bin range: 4,
Third bin range: 7,
Fourth bin range: 5,
Fifth bin range: 2,
Sixth bin range: 1.

In this example, a cumulative frequency for the first bin range is 1. A cumulative frequency for the second bin range is 5 (=1+4). A cumulative frequency for the third bin range is 12 (=5+7). A cumulative frequency for the fourth bin range is 17 (=12+5). A cumulative frequency for the fifth bin range is 19 (=17+2). A cumulative frequency for the sixth bin range is 20 (=19+1). Accordingly, the maximum value of the cumulative frequencies is 20 in the frequency information exemplified in FIG. 3, and thus, the given number as described above is 20 in the example illustrated in FIG. 3.

In other words, the frequency information includes information representing the cumulative frequencies concerning frequencies generated for the given number of the second random numbers in the target bin ranges (e.g., the first bin range to the sixth bin range). Concerning the frequency information, the frequency is a frequency calculated when the bin range including the second random number is determined with desired precision. The target bin ranges represent bin ranges that are targets for which the frequencies are calculated.

Figure 7:
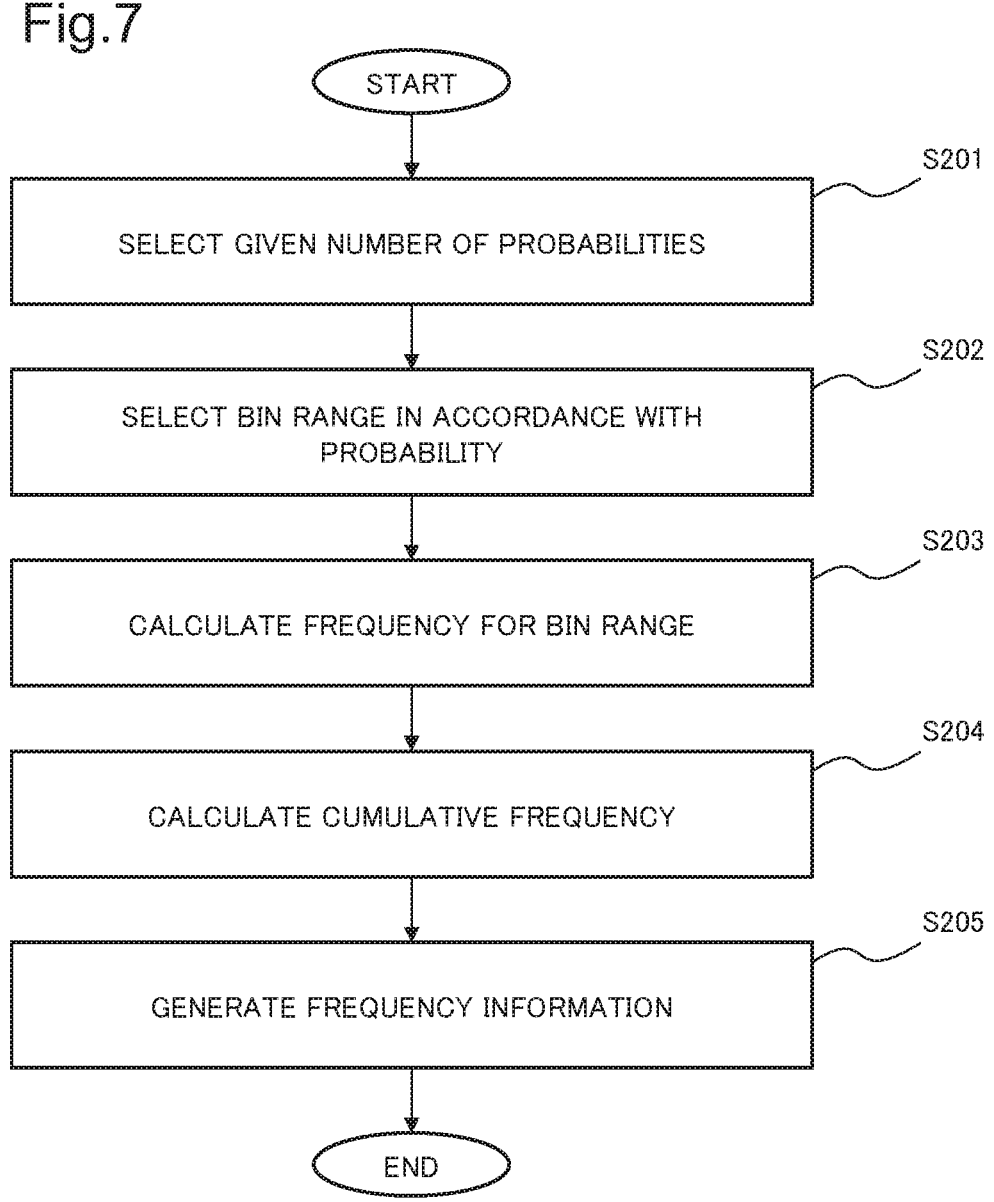
FIG. 7 is a flowchart illustrating a flow of processing of generating frequency information among processing of the random number generation device according to the second example embodiment.

The frequency information may be generated in accordance with the processing to be described below with reference to FIG. 7, for example. Alternatively, for the frequency information, a binomial distribution configured by using a given number and a probability for each bin range is used, and thereby, the given number of random numbers can be generated. This processing will be described in detail with reference to Equations 1 to 3 in the second example embodiment. By generating the frequency information using a binomial distribution, random numbers can be efficiently and precisely generated even when a given number is large. The reason for this will be described in detail in the second example embodiment.

Figure 2:
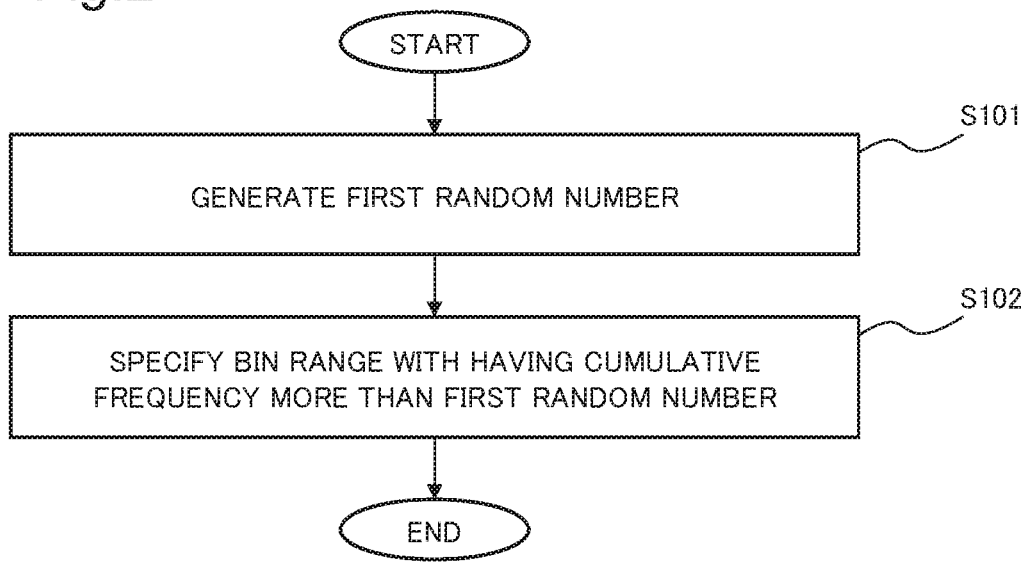
FIG. 2 is a flowchart illustrating a flow of processing in the random number generation device according to the first example embodiment.

Next, with reference to FIG. 2, the detailed description will be made on processing in the random number generation device 101 according to the first example embodiment of the present invention. FIG. 2 is a flowchart illustrating a flow of the processing in the random number generation device 101 according to the first example embodiment.

The random number generation unit 102 generates at least one random number (hereinafter, referred to as "a first random number") for a numeric value ranging from 1 to a given number (Step S101). Accordingly, the random number generation unit 102 generates a first random number based on the given number. The random number generation unit 102 selects a first random number from a uniform distribution without overlap, for example. In a loop process illustrated in FIG. 8 to be described below, when executing the loop process, the random number generation unit 102 randomly selects the first random number from values that are in a predetermined range and that are other than values appeared in the past, for example. A first random number may be a random number generated in accordance with the processing to be described below with reference to Step S211 in FIG. 8, or may be generated by randomly rearranging integers from 1 to a given number. The method of generating a first random number is not limited to the above-described example.

The random number generation unit 102 inputs the generated first random number to the specification unit 103.

The specification unit 103 receives the first random number generated by the random number generation unit 102. The specification unit 103 specifies a bin range that is in the frequency information (exemplified in FIG. 3) stored in the frequency information storage unit 104 and whose cumulative frequency exceeds the first random number (Step S102). For convenience of description, it is assumed that the first random number is 8. In the case of the frequency information exemplified in FIG. 3, the bin range whose cumulative frequency in the frequency information exceeds the first random number (8 in this example) is the third bin range (i.e., the bin range $x_3$). Accordingly, in the frequency information exemplified in FIG. 3, the specification unit 103 specifies the third bin range in the processing at Step S102.

The specification unit 103 may output identification information for identifying the specified bin range. The identification information is a numeric value such as an upper limit value or a lower limit value in the bin range, for example.

The random number generation device 101 may specify a bin range for each random number by executing the processing illustrated in FIG. 2 a given number of times, and may output information representing the specified bin ranges. Executing the processing illustrated in FIG. 2 a given number of times enables generation of random numbers that follow a cumulative frequency (i.e., a distribution concerning second random numbers) in the frequency information.

The random number generation device 101 may execute the processing of executing the processing illustrated in FIG. 2 a given number of times, on first random numbers generated in accordance with random number sequences different from each other. In this case, the random number generation device 101 executes the processing illustrated in FIG. 2 a given number of times, and thereby, can generate a plurality of random number sequences that follow a cumulative frequency (i.e., a distribution concerning second random numbers) in the frequency information.

The random number generation unit 102 may generate a given number of first random numbers different from each other. In this case, for each of first random numbers generated by the random number generation unit 102, the specification unit 103 executes processing of specifying the bin range in accordance with the first random number. As a result, the random number generation device 101 can generate a given number of the random numbers that follow a distribution of second random numbers.

Next, the description will be made on advantageous effects concerning the random number generation device 101 according to the first example embodiment of the present invention.

The random number generation device 101 according to the first example embodiment can generate precise random numbers with a memory capacity that does not depend on precision. The following will describe the reason for this.

For convenience of description, it is assumed that precision of a numeric value is a length of a bit string representing the numeric value (i.e., the number of digits of the numeric value). Further, it is assumed that the length of the bit string is e (e is a positive integer such as 128, 256, 512, 1024, 2048, or 4096). In this case, the numeric value is represented by using e bits.

As a random number used in lattice-based cryptography or the like, a random number having desired precision is used. In this processing, a random number U having e bits is generated as a random number, and processing of specifying a bin range including the generated random number U is executed, for example. In lattice-based cryptography or the like, the processing of specifying a bin range including the random number U is executed in a cumulative probability function $\varphi$ representing a cumulative probability for a certain probability distribution, for example. The cumulative probability is calculated by summing probabilities for a random variable in ascending order of values of the random variable. In other words, the cumulative probability represents a probability of the case where a value of a random variable is equal to or smaller than a certain value. The processing of specifying a bin range can be represented as processing of specifying a numeric value k that satisfies "$\varphi(k-1)<$(random number U)$\leq\varphi(k)$".

In the processing of specifying a bin range, a value concerning the cumulative probability function $\varphi$ is given as follows, for example.

$\varphi(-1)=0.44444$,
$\varphi(0)=0.55555$,
$\varphi(1)=0.64444$.

In the processing of specifying a bin range, it is assumed that a value of the cumulative probability function $\varphi$ is represented with desired precision. In this example, the bin ranges are two bin ranges (i.e., a bin range "$\varphi(-1)<$(random number U)$\leq\varphi(0)$") and a bin range "$\varphi(0)<$(random number U)$\leq\varphi(1)$").

For convenience of description, it is assumed that the random number U is 0.54321.

In the processing of specifying a bin range for the random number U, magnitude comparison of $\varphi(-1)$, $\varphi(0)$, and $\varphi(1)$ with the random number U is performed with desired precision, for example. In this example, "$\varphi(0)<$(random number U)$\leq\varphi(1)$" is satisfied, and thus, in the processing of specifying a bin range, 0 is generated as a numeric value k. Accordingly, when the number of bin ranges is m (m is a natural number), reference information having a size of (m×e) bits is referred to in the processing of specifying a bin range. In the reference information, a bin range and a threshold value that is a basis for specifying the bin range are associated with each other. Accordingly, the higher precision of a random number is, the more memory capacity is required for the processing of generating the random number.

In contrast, in the random number generation device 101 according to the first example embodiment, the frequency information refers to information smaller than (m×e) bits. The following will describe the reason for this.

For convenience of description, it is assumed that the number of bin ranges is m as in the above description.

In the frequency information exemplified in FIG. 3, it is assumed that a cumulative frequency is an integer and is represented by using j (j is a natural number) bits. The given number is a value (a value such as $2^{32}$ or $2^{64}$) depending on a type of a block cipher, for example. Accordingly, in this case, j is a value of 32 (bits) or 64 (bits). For this reason, the number j of bits representing a cumulative frequency is smaller than the number e of bits representing the desired precision.

In the random number generation device 101 according to the first example embodiment, the frequency information (exemplified in FIG. 3) has a size of (m×j) bits. Accordingly, the frequency information (exemplified in FIG. 3) has a size smaller than (m×e) bits, and thus, the random number generation device 101 can make the generation with a small memory capacity. Further, the memory capacity is constant regardless of the precision (i.e., the desired precision) for the random numbers. Therefore, the random number generation device 101 can make the generation with a memory capacity that does not depend on precision.

Further, as described above with reference to FIG. 3, the frequency information represents a frequency in a bin range when a given number of random numbers are generated with desired precision, and concerning the generated random numbers, the bin ranges for the random numbers are specified with the desired precision. Thus, the bin ranges specified based on the frequency information are information similar to bin ranges specified referring to reference information. For this reason, the random number generation device 101 according to the first example embodiment can generate a precise random number.

In terms of a summary of the above-described advantageous effects, the random number generation device 101 according to the first example embodiment can generate a precise random number with a memory capacity that does not depend on precision.

Second Example Embodiment

Next, the description will be made on a second example embodiment of the present invention based on the above-described first example embodiment.

Figure 6:
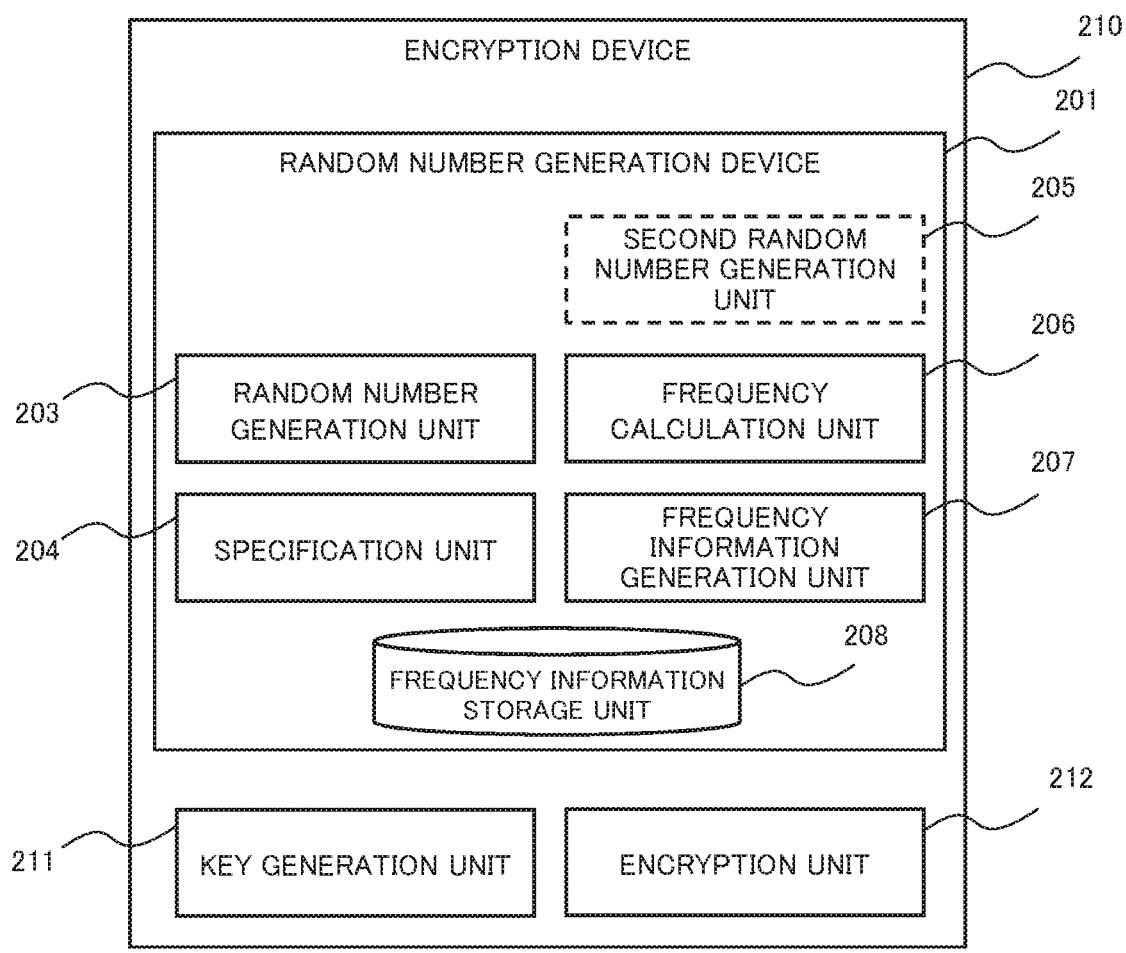
FIG. 6 is a block diagram illustrating a configuration of a random number generation device according to a second example embodiment of the present invention.

With reference to FIG. 6, the following will describe, in detail, a configuration of a random number generation device 201 according to the second example embodiment of the present invention. FIG. 6 is a block diagram illustrating the configuration of the random number generation device 201 according to the second example embodiment of the present invention.

The random number generation device 201 according to the second example embodiment includes a random number generation unit (random number generator) 203, a specification unit (specifier) 204, a frequency information storage unit 208, a frequency calculation unit (frequency calculator) 206, and a frequency information generation unit (frequency information generator) 207. The random number generation device 201 may further include a second random number generation unit (second random number generator) 205.

The frequency information storage unit 208 stores frequency information (exemplified in FIG. 3) generated in accordance with the processing to be described below with reference to FIG. 7. In accordance with the processing to be described below with reference to FIG. 8, the specification unit 204 specifies a bin range for a certain numeric value, based on the frequency information (exemplified in FIG. 3) stored in the frequency information storage unit 208. For example, the processing in the specification unit 204 may be processing similar to the processing described above with reference to FIG. 2.

For example, the random number generation device 201 may be included in an encryption device 210 as exemplified in FIG. 6. In this case, the encryption device 210 includes the random number generation device 201, a key generation unit (key generator) 211, and an encryption unit (encrypter) 212.

Processing in the random number generation device 201 according to the second example embodiment is roughly classified into processing (described below with reference to FIG. 7) of generating frequency information and processing (described below with reference to FIG. 8) of specifying a bin range for a certain numeric value, based on the generated frequency information.

Next, with reference to FIG. 7, the description will be made on the processing of generating the frequency information (exemplified in FIG. 3) included in the processing in the random number generation device 201 according to the second example embodiment of the present invention. FIG. 7 is a flowchart illustrating a flow of processing of generating frequency information among processing of the random number generation device 201 according to the second example embodiment.

The second random number generation unit 205 selects a given number of probabilities that follow a predetermined probability distribution (exemplified in FIG. 4) (Step S201). The processing of selecting the probabilities is processing of random selection or pseudo-random selection, for example. The probability is represented with desired precision (or a desired number of digits), and is represented by using e bits, for example. The second random number generation unit 205 inputs, to the frequency calculation unit 206, information representing the selected probabilities. Further, for example, the predetermined probability distribution is a distribution in a discrete Gaussian distribution where the average is zero and probabilities are normalized for bin ranges other than bin ranges in which probabilities can be approximated to zero.

The frequency calculation unit 206 receives, from the second random number generation unit 205, information representing the probabilities. The frequency calculation unit 206 selects a bin range in accordance with each of the probabilities with at least desired precision (Step S202). For each bin range, the frequency calculation unit 206 calculates a frequency (the number of times) of selection made at Step S202 (Step S203). The frequency calculation unit 206 executes Step S202 and Step S203 the number of times corresponding to the number (i.e., the given number) of the random numbers. The processing at Step S202 and Step S203 is processing similar to that described with reference to FIG. 5. The frequency calculation unit 206 inputs, to the frequency information generation unit 207, information representing the calculated frequencies.

The frequency information generation unit 207 receives the information representing the frequencies from the frequency calculation unit 206. For the information representing the frequencies, the frequency information generation unit 207 calculates summed values in order from bin ranges with smaller values, and thereby calculates cumulative frequencies for the given bin ranges (Step S204). The frequency information generation unit 207 generates frequency information (exemplified in FIG. 3) in which information representing the bin range is associated with the cumulative frequency calculated for the bin range (Step S205), and stores the generated frequency information in the frequency information storage unit 208.

Figure 8:
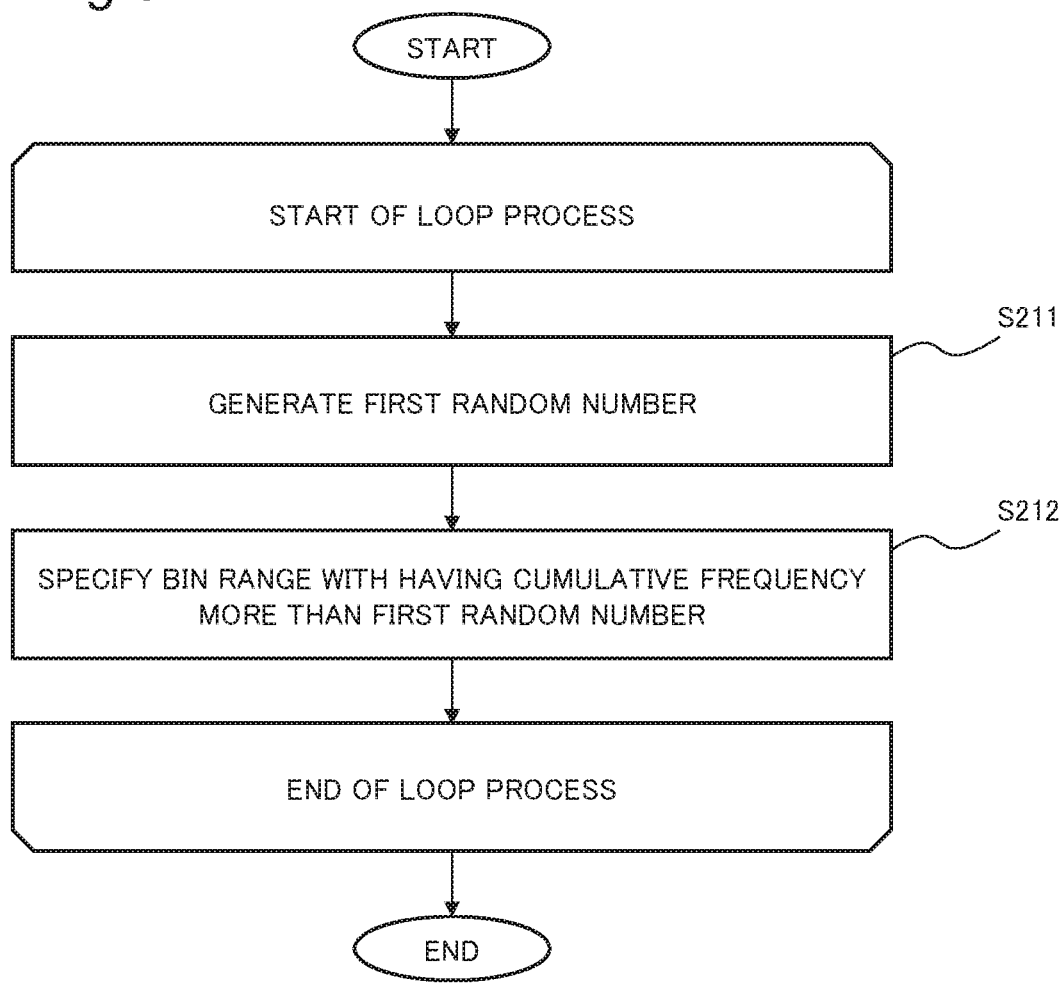
FIG. 8 is a flowchart illustrating a flow of the processing of specifying a bin range for a certain numeric value based on the frequency information among the processing of the random number generation device according to the second example embodiment.

Next, with reference to FIG. 8, the description will be made on processing of specifying a bin range for a certain numeric value based on the frequency information (exemplified in FIG. 3) among processing of the random number generation device 201 according to the second example embodiment of the present invention. FIG. 8 is a flowchart illustrating a flow of the processing of specifying a bin range for a certain numeric value based on the frequency information (exemplified in FIG. 3) among processing of the random number generation device 201 according to the second example embodiment.

Processing of Step S211 to Step S212 illustrated in FIG. 8 is repeatedly executed in the loop process for each of first random numbers.

For example, the random number generation unit 203 generates a first random number by encrypting at least one numeric value among numeric values from one to a given number in accordance with a predetermined encryption processing (Step S211). For example, the predetermined encryption processing is processing that follows a block cipher method of making encryption by using an encryption key. When calculating a plurality of first random numbers, the random number generation unit 203 encrypts, in accordance with block cipher, plain texts that are different from each other per loop process illustrated in FIG. 8 by using a certain encryption key, and thereby generates the first random numbers. For example, the different plain texts are values randomly selected from numerals from one to the given number without overlapping with each other.

The block cipher is encryption of generating different cipher texts for different plain texts. Accordingly, plain texts different per loop process illustrated in FIG. 8 are encrypted by using the block cipher, and thereby, the cipher texts different per loop process are generated. In the present example embodiment, the cipher texts are used as the first random numbers.

For example, input (plain texts, in this case) to the block cipher is numerals that do not overlap with each other per loop process. For example, the input may be set by selecting values different per loop process among natural numbers from one to M. Alternatively, the input may be a natural number I at the I-th (here, I is a natural number) loop process. As a result of such processing, the input to the block cipher is mutually different per loop process, and thus, the cipher texts encrypted in accordance with the block cipher are different from each other. For this reason, the cipher texts can be used as the first random numbers.

For convenience of description, a cipher text generated by encrypting a plain text C by using an encryption key K is denoted as "Enc(K, C)".

In the example described above, the random number generation unit 203 generates, as the first random numbers, cipher texts such as Enc(K, 1), Enc(K, 2), and Enc(K, 3), for example.

The random number generation unit 203 inputs, to the specification unit 204, information representing the generated first random numbers.

The specification unit 204 receives, from the random number generation unit 203, the information representing the first random numbers. The specification unit 204 specifies a bin range in which a cumulative frequency exceeds the first random number among frequency information (exemplified in FIG. 3) stored in the frequency information storage unit 208 (Step S212). As described above, a cumulative frequency is represented with precision lower than desired precision for the second random numbers. Accordingly, the processing of specifying a cumulative frequency can be implemented with processing amount less than the processing of specifying a bin range for a second random number with desired precision.

For example, in the above-described example, a condition for classifying the first random numbers into the first bin range to the sixth bin range can be represented by using threshold values $t_1$ to $t_6$ as described in the following.

First bin range: the first random number is equal to or smaller than $t_1$,

Second bin range: the first random number is larger than $t_1$ and equal to or smaller than $t_2$, Third bin range: the first random number is larger than $t_2$ and equal to or smaller than $t_3$, Fourth bin range: the first random number is larger than $t_3$ and equal to or smaller than $t_4$, Fifth bin range: the first random number is larger than $t_4$ and equal to or smaller than $t_5$, Sixth bin range: the first random number is larger than $t_5$ and equal to or smaller than $t_6$.

In the case of the frequency information exemplified in FIG. 3, $t_1$ is 1, $t_2$ is 5, $t_3$ is 12, $t_4$ is 17, $t_5$ is 19, and $t_6$ is 20, for example.

In other words, at Step S212, the specification unit 204 specifies "i" that satisfies "$(t_{i-1})<$(first random number)$\leq t_i$", and thereby specifies a bin range for the first random number. The specification unit 204 may output identification information ("i", in this example) that represents the specified bin range. At Step S212, the specification unit 204 can specify a bin range in accordance with a binary search method, for example.

Next, one example of processing of generating frequency information will be described. This processing is one example of processing that implements processing represented by Step S201 to Step S203 in FIG. 7.

For convenience of description, it is assumed that frequency information is generated for the first bin range to the m-th (m represents a natural number) bin range. Further, in accordance with a predetermined probability distribution, a probability (e.g., a probability indicated in the vertical axis direction in FIG. 4) for the i-th (here, $1 \leq i \leq m$) bin range is denoted as $p_i$. In the processing of generating frequency information, the frequency calculation unit 206 calculates a frequency in the i-th bin range. Further, concerning the i-th bin range, it is assumed that the frequency calculation unit 206 calculates frequencies in order from a bin range with smaller "i" (e.g., from the left to the right in the horizontal axis direction in FIG. 4). However, the frequency calculation unit 206 does not necessarily have to make the generation in order from a bin range with smaller "i". Further, it is assumed that N denotes a given number. It is assumed that "$_aC_b$" denotes the number of combinations of selecting b pieces from a pieces. In addition, "Pr(A|B)" denotes a conditional probability that an event A occurs when an event B occurs.

The frequency calculation unit 206 calculates a frequency (i.e., $k_1$) in the first bin range, based on an occurrence probability (exemplified in Equation 1) that a frequency in the first bin range is $k_1$ ($k_1$ is a natural number) and a frequency in the bin ranges other than the first bin range is $(N-k_1)$, out of the N random numbers following the predetermined probability distribution.

$$_NC_{k_1} \times p_1^{k_1} \times (1-p_1)^{N-k_1} \qquad \text{(Eqn. 1)}$$

The following will describe the processing more specifically. The second random number generation unit 205 generates a second random number. The frequency calculation unit 206 calculates, as the frequency in the first bin range, the frequency $k_1$ such that a cumulative probability concerning the binomial distribution exemplified in Equation 1 exceeds the second random number.

For convenience of description, the frequency calculated for the first bin range is denoted as "$d_1$". In this case, the distribution expressed in Equation 1 can be expressed also as $Pr(n_1=d_1)$.

Next, the frequency calculation unit 206 calculates a frequency (i.e., $k_2$) in the second bin range, based on an occurrence probability (exemplified in Equation 2) that a frequency in the second bin range is $k_2$ ($k_2$ is a natural number), out of the N random numbers following the predetermined probability distribution, when the frequency in the first bin range is $d_1$.

$$_{N-d_1}C_{k_2} \times p_2^{k_2} \times (1-p_2)^{N-d_1-k_2} \qquad \text{(Eqn. 2)}$$

The binomial distribution expressed in Equation 2 represents a probability that a frequency in the second bin range is $k_2$ and a frequency other than in the first bin range and the second bin range is other than $(N-d_1-k_2)$ in pieces $(N-d_1)$ excluding the frequency $(d_1)$ in the first bin range, out of the N random numbers following the predetermined probability distribution.

The following will describe the processing more specifically. The second random number generation unit 205 generates a second random number. The frequency calculation unit 206 calculates, as the frequency in the second bin range, the frequency $k_2$ such that a cumulative probability distribution concerning the binomial distribution exemplified in Equation 2 exceeds the second random number.

For convenience of description, the frequency calculated for the first bin range is denoted as "$d_2$". In this case, the distribution expressed in Equation 2 can be represented also as $Pr(n_2=d_2|n_1=d_1)$.

Also for the third and subsequent bin ranges, the second random number generation unit 205 and the frequency calculation unit 206 execute processing similar to the above-described processing, and thereby calculate a frequency in each bin range.

Next, the description will be made on processing in which the frequency calculation unit 206 calculates a frequency in the i-th bin range. In this case, based on the above-described assumption, frequencies in the first bin range to the (i-1)-th bin range are calculated as $d_1$ to $d_{i-1}$, respectively. When the frequencies in the first bin range to the (i-1)-th bin range are calculated as described above, the frequency calculation unit 206 calculates a frequency (i.e., $k_i$) in the i-th bin range, based on an occurrence probability (exemplified in FIG. 3) that a frequency in the i-th bin range is $k_i$ ($k_i$ is a natural number), out of N random numbers following the predetermined probability distribution.

$$_{N-\sum_{j=1}^{i-1} d_j} C_{k_i} \times p_i^{k_i} \times (1-p_i)^{N-\sum_{j=1}^{i-1} d_j - k_i} \quad \text{(Eqn. 3)}$$

The binomial distribution expressed in Equation 3 represents a probability that a frequency in the i-th bin range is $k_i$ and a frequency other than in the first bin range to (i-1)-th bin range is other than $(N-d_1-d_2-\ldots-d_{i-1})$ when frequencies in the first bin range to the (i-1)-th bin range are $d_1$ to $d_{i-1}$, respectively, out of the N random numbers following the predetermined probability distribution.

The following will describe the processing more specifically. The second random number generation unit 205 generates a second random number. The frequency calculation unit 206 calculates, as a frequency in the i-th bin range, $k_i$ such that a cumulative probability distribution concerning the binomial distribution exemplified in Equation 3 exceeds the second random number. In this case, the distribution expressed in Equation 3 can also be denoted as $\Pr(n_i = d_i | n_1 = d_1, n_2 = d_2, \ldots, n_{i-1} = d_{i-1})$.

The processing as described above is repeatedly executed for the first bin range to the (m-1)-th bin range. The frequency calculation unit 206 calculates a frequency in the m-th bin range by subtracting, from the given number, respective frequencies in the first bin range to the (m-1)-th bin range, for example.

Next, the brief description will be made on one example of the encryption device 210 in which an encryption method such as lattice-based cryptography is implemented by using a random number generated by the random number generation device 201. However, there are many known methods for implementing lattice-based cryptography by using a random number, and for this reason, detailed description thereof will be omitted in the present example embodiment. Further, an encryption device implemented by using a random number generated by the random number generation device 201 is not limited to the example described below.

The key generation unit 211 outputs, as an encryption key, information representing a bin range specified by the random number generation device 201. For example, the information is an upper limit value in the bin range. The upper limit value can be treated as a random number. Accordingly, the encryption unit 212 receives a random number from the random number generation device 201, and outputs the received random number as the encryption key.

The encryption unit 212 receives, concerning at least one bin range, information representing the bin range specified by the random number generation device 201. Further, the encryption unit 212 receives information representing an encryption-target plain text. As described above, the information is an upper limit value in the bin range, for example. The upper limit value can be treated as a random number. Accordingly, the encryption unit 212 receives at least one random number from the random number generation device 201. The encryption unit 212 applies a predetermined encryption processing to the encryption key, the plain text, and the random number, and thereby generates a cipher text for the plain text. For example, the predetermined encryption processing is processing of setting the random number as noise and encrypting the plain text by using the encryption key and the noise.

Next, the description will be made on advantageous effects concerning the random number generation device 201 according to the second example embodiment of the present invention.

The random number generation device 201 according to the second example embodiment can generate a precise random number with a memory capacity that does not depend on precision. The reason for this is similar to the reason described in the first example embodiment.

Further, the encryption device 210 that executes encryption processing and the like, based on a random number generated by the random number generation device 201 according to the second example embodiment can maintain high security for encryption. The reason for this is that the random number generation device 201 generates a precise random number as described above in the first example embodiment.

Further, the random number generation device 201 according to the second example embodiment can efficiently generate a plurality of random numbers. The reason for this is that a processing amount of the processing of generating random numbers by encrypting a plurality of numeric values among one to a given number in accordance with the block cipher is smaller than that of processing of generating random numbers by shuffling a plurality of numeric values. An example of a method of generating a plurality of random numbers without overlapping with each other includes a method of rearranging (shuffling) numeric values included in a numeric string concerning the numeric string including numerals without overlapping with each other, and thereby generating random numbers. Meanwhile, the random number generation device 201 encrypts different plain texts by using block cipher, and thereby generates random numbers. As for a method of generating random numbers by shuffling a plurality of numeric values, an amount of processing required for processing of selecting the unshuffled numeric value as a shuffling target increases as the processing of shuffling a plurality of the numeric values proceeds. Meanwhile, the processing in the random number generation device 201 is operation of encrypting a plurality of numeric values in accordance with the block cipher and thereby generating random numbers. In the processing of generating random numbers by making encryption in accordance with the block cipher, even when a plurality of random numbers are generated, a processing amount does not increase as the processing proceeds. As a result, the random number generation device 201 according to the second example embodiment can further efficiently generate a plurality of random numbers.

Further, the random number generation device 201 according to the second example embodiment can generate a plurality of random number sequences with a memory capacity that does not depend on precision even when generating a plurality of the random number sequences including a plurality of random numbers having desired precision. The reason for this is that the frequency calculation unit 206 can specify a bin range for a first random number, based on frequency information (exemplified in FIG. 3) generated by specifying a bin range including a second random number with desired precision.

Furthermore, the random number generation device 201 according to the second example embodiment calculates a frequency based on a cumulative distribution concerning a binomial distribution, and thereby, can efficiently generate frequency information (exemplified in FIG. 3). The reason for this is that a given number of pieces of frequency information can be calculated by the number of times of random number calculation that is smaller than the given number.

Hardware Configuration Example

A configuration example of hardware resources that achieve a random number generation device or an encryption device according to each example embodiment of the present invention using a computer processing device (information processing device, compute) will be described. However, the random number generation device may be achieved using physically or functionally at least two calculation processing devices. Further, the random number generation device or the encryption device may be achieved as a dedicated device.

Figure 9:
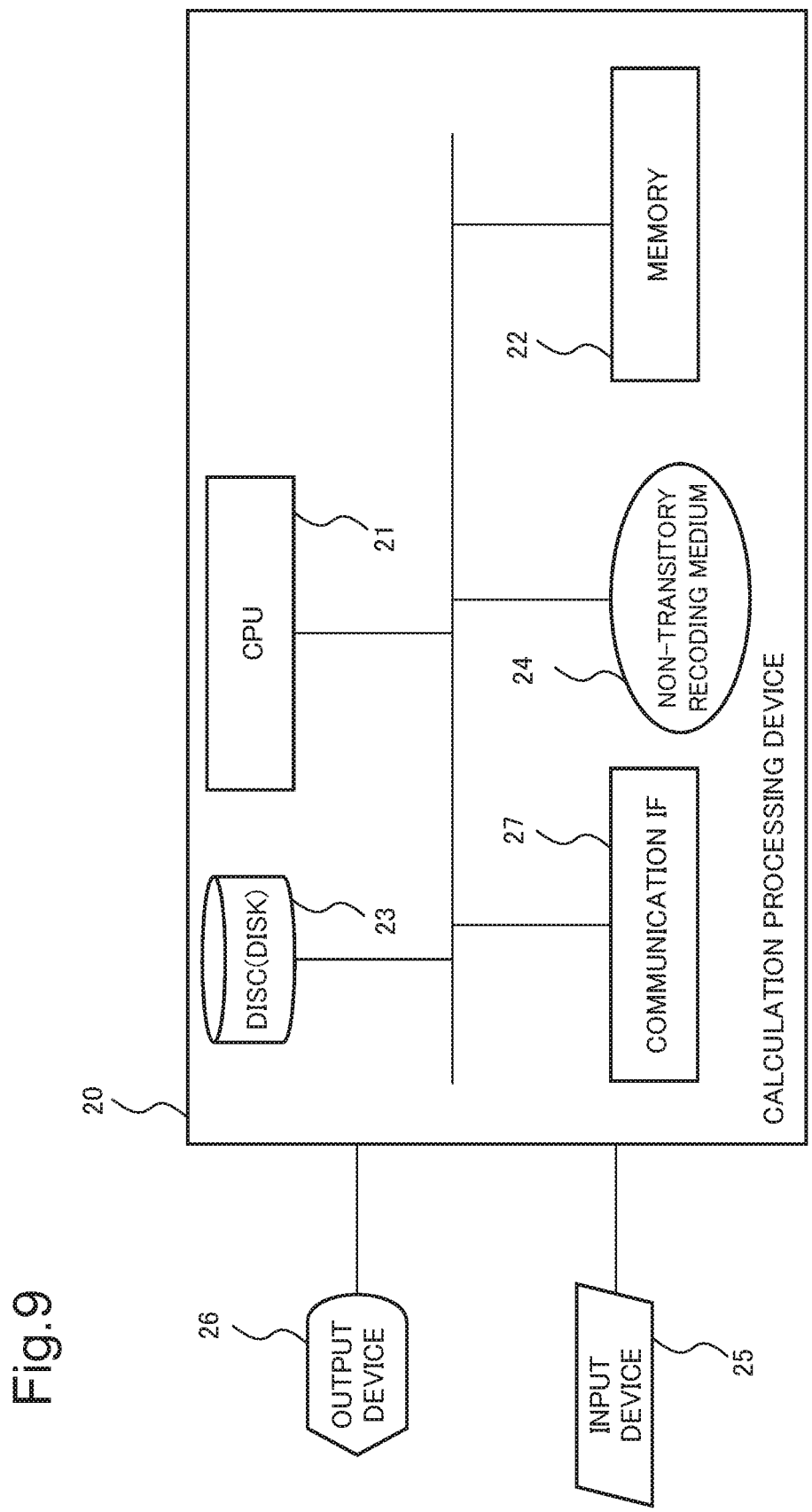
FIG. 9 is a block diagram schematically illustrating a hardware configuration of a calculation processing device capable of achieving a random number generation device or an encryption device according to each example embodiment of the present invention.

FIG. 9 is a block diagram schematically illustrating a hardware configuration of a calculation processing device capable of achieving a random number generation device or an encryption device according to each example embodiment of the present invention. A calculation processing device 20 includes a central processing unit (CPU) 21, a memory 22, a disk (disc) 23, a non-transitory recording medium 24 and a communication interface (hereinafter, expressed as. "communication I/F") 27. The calculation processing device 20 may connect an input device 25 and an output device 26. The calculation processing device 20 can execute transmission/reception of information to/from another calculation processing device and a communication device via the communication I/F 27.

The non-transitory recording medium 24 is, for example, a computer-readable Compact Disc, Digital Versatile Disc. The non-transitory recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored in the disk 23 when executing the program and executes arithmetic processing. The CPU 21 reads data necessary for program execution from the memory 22. When display is needed, the CPU 21 displays an output result on the output device 26. When a program is input from the outside, the CPU 21 reads the program from the input device 25. The CPU 21 interprets and executes a random number generation program (FIG. 2, FIG. 7, or FIG. 8) present on the memory 22 corresponding to a function (processing) indicated by each unit illustrated in FIG. 1 or FIG. 6 described above. The CPU 21 sequentially executes the processing described in each example embodiment of the present invention.

In other words, in such a case, it is conceivable that the present invention can also be made using the random number generation program. Further, it is conceivable that the present invention can also be made using a computer-readable, non-transitory recording medium storing the random number generation program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

A part of or all of the above-described example embodiments may be described as the following supplementary notes. However, the present invention exemplarily described in the above-described example embodiments is not limited to the following.

Supplementary Note 1

A random number generation device comprising:
a random number generation means for generating first random numbers based on given number; and
a specification means for specifying, for the given number of second random numbers in a target numeric extent, bin range depending on the first random numbers based on frequency information representing cumulative frequency regarding a frequency of numeric extent including respective second random numbers among given numeric extents, the numeric extent being determined in accordance with a desirable precision.

Supplementary Note 2

The random number generation device according to supplementary note 1, wherein
the random number generation means generates the given number of the first random numbers different from each other.

Supplementary Note 3

The random number generation device according to supplementary note 1 or supplementary note 2, wherein
the random number generation means encrypts, at least, a numeric value from one to the given number in accordance with a predetermined encryption processing for generating a cipher text with an encryption key and, thereby, generates the first random numbers different from each other and
the predetermined encryption processing is an operation of generating a cipher text that is different from each other depending on each numeric value.

Supplementary Note 4

The random number generation device according to any one of supplementary notes 1 to 3, wherein
the specification means specifies the numeric extent with having the cumulative frequency more than each of the second random numbers when specifying numeric extent for a plurality of the first random numbers based on the frequency information.

Supplementary Note 5

The random number generation device according to supplementary note 3, wherein
the random number generation means encrypts natural numbers between 1 and the given number with the encryption key in accordance with the predetermined encryption processing and, thereby, generates the plurality of the first random numbers and the specification means specifies each numeric extent for the plurality of the first random numbers.

Supplementary Note 6

The random number generation device according to any one of supplementary notes 1 to 5, further comprising:
a frequency calculation means for specifying the numeric extent including each of the second random numbers in accordance with the desirable precision and calculating the frequency of the numeric extent; and
a frequency information generation mean for calculating the cumulative frequency for the calculated frequency and generating the frequency information representing the calculated cumulative frequency.

Supplementary Note 7

The random number generation device according to supplementary note 6, further comprising:
a random number generation means for calculating the second random numbers following a predetermined probability distribution in accordance with the desirable precision.

Supplementary Note 8

The random number generation device according to supplementary note 6 or supplementary note 7, wherein
the frequency calculation means calculates the frequency for a cumulative probability depending on a random number between 0 and 1 based on the cumulative probability being a sum of occurrence probabilities for occurrence frequency of the numeric extent out of the given number.

Supplementary Note 9

An encryption device comprising:
a random number generation device according to any one of supplementary notes 1 to 8; and
a key generation means for generating, as an encryption key, information representing the numeric extent specified by the random number generation device.

Supplementary Note 10

The encryption device according to supplementary note 9, further comprising:
an encryption means for setting information representing the numeric extent specified by the random number generation device to a noise and executing an encryption process by using the encryption key and the noise.

Supplementary Note 11

A random number generation method, by an information processing device, comprising:
generating first random numbers based on given number; and
specifying, for the given number of second random numbers in a target numeric extent, bin range depending on the first random numbers based on frequency information representing cumulative frequency regarding a frequency of numeric extent including respective second random numbers among given numeric extents, the numeric extent being determined in accordance with a desirable precision.

Supplementary Note 12

A recoding medium storing a random number generation program causing a computer to achieve:
a random number generation function for generating first random numbers based on given number; and
a specification function for specifying, for the given number of second random numbers in a target numeric extent, bin range depending on the first random numbers based on frequency information representing cumulative frequency regarding a frequency of numeric extent including respective second random numbers among given numeric extents, the numeric extent being determined in accordance with a desirable precision.

INDUSTRIAL APPLICABILITY

A learning device using a random number, a simulation device of executing a simulation, such as a Monte-Carlo method, using a random number, and the like other than the above-described encryption device may employ a random number generated by a random number generation device according to each example embodiment described above. Furthermore, devices executing a process in accordance with a randomized algorithm may employ the random number.

REFERENCE SIGNS LIST 101 random number generation device
102 random number generation unit
103 specification unit
104 frequency information storage unit
201 random number generation device
203 random number generation unit
204 specification unit
205 second random number generation unit
206 frequency calculation unit
207 frequency information generation unit
208 frequency information storage unit
210 encryption device
211 key generation unit
212 encryption unit
20 calculation processing device
21 CPU
22 memory
23 disk
24 non-transitory recording medium
25 input device
26 output device
27 communication IF

What is claimed is:
1. A random number generation device comprising:
a memory for storing instructions; and
a processor connected to the memory and configured to execute the instructions to:
generate first random numbers based on a given number;
specify, for second random numbers in a target numeric extent, bin ranges depending on the first random numbers based on frequency information representing cumulative frequency regarding a frequency in numeric extent including respective second random numbers among given numeric extents, the numeric extent being determined in accordance with a desirable precision, a number of the second random numbers being the given number;
encrypt natural numbers between 1 and the given number with an encryption key in accordance with a predeter- mined encryption processing and, thereby, generate the plurality of the first random numbers, the predetermined encryption processing being an operation of generating a cipher text that is different from each other depending on each numeric value; and specify the numeric extent for each of the plurality of the first random numbers.

2. The random number generation device according to claim 1, wherein the processor is configured to execute the instructions to generate the first random numbers different from each other, a number of the first random numbers being the given number.

3. The random number generation device according to claim 1, wherein the processor is configured to execute the instructions to specify the numeric extent with having the cumulative frequency more than each of the second random numbers when specifying numeric extent for a plurality of the first random numbers based on the frequency information.

4. The random number generation device according to claim 1, wherein the processor is configured to execute the instructions to specify the numeric extent including each of the second random numbers in accordance with the desirable precision and calculate the frequency of the numeric extent; and calculate the cumulative frequency for the calculated frequency and generate the frequency information representing the calculated cumulative frequency.

5. The random number generation device according to claim 4, wherein the processor is configured to execute the instructions to calculate the second random numbers following a predetermined probability distribution in accordance with the desirable precision.

6. The random number generation device according to claim 4, wherein the processor is configured to execute the instructions to calculate the frequency for a cumulative probability depending on a random number between 0 and 1 based on the cumulative probability being a sum of occurrence probabilities for occurrence frequency of the numeric extent.

7. An encryption device comprising:

a random number generation device according to claim 1, wherein the processor is configured to execute the instructions to generate, as an encryption key, information representing the numeric extent specified by the random number generation device.

8. The encryption device according to claim 7, wherein the processor is configured to execute the instructions to set information representing the numeric extent specified by the random number generation device to a noise and execute an encryption process by using the encryption key and the noise.

9. A random number generation method, by an information processing device, comprising:

generating first random numbers based on a given number; and specifying, second random numbers in a target numeric extent, bin ranges depending on the first random numbers based on frequency information representing cumulative frequency regarding a frequency in numeric extent including respective second random numbers among given numeric extents, the numeric extent being determined in accordance with a desirable precision, a number of the second random numbers being the given number;

encrypting natural numbers between 1 and the given number with an encryption key in accordance with a predetermined encryption processing and, thereby, generating the plurality of the first random numbers, the predetermined encryption processing being an operation of generating a cipher text that is different from each other depending on each numeric value; and specifying the numeric extent for each of the plurality of the first random numbers.

10. A non-transitory recoding medium storing a random number generation program causing a computer to achieve:

a random number generation function configured to generate first random numbers based on a given number;

a specification function configured to specify, for second random numbers in a target numeric extent, bin ranges depending on the first random numbers based on frequency information representing cumulative frequency regarding a frequency in numeric extent including respective second random numbers among given numeric extents, the numeric extent being determined in accordance with a desirable precision, a number of the second random numbers being the given number;

encrypting natural numbers between 1 and the given number with an encryption key in accordance with a predetermined encryption processing and, thereby, generating the plurality of the first random numbers, the predetermined encryption processing being an operation of generating a cipher text that is different from each other depending on each numeric value; and specifying the numeric extent for each of the plurality of the first random numbers.

* * * * *